US010460696B2

(12) United States Patent
Moritani et al.

(10) Patent No.: US 10,460,696 B2
(45) Date of Patent: Oct. 29, 2019

(54) ELECTRONIC DEVICE FOR REPORTING INFORMATION, DISPLAY METHOD THEREFOR, AND RECORDING MEDIUM

(71) Applicant: CASIO COMPUTER CO., LTD., Tokyo (JP)

(72) Inventors: Shinichi Moritani, Kanagawa (JP);
Tomokazu Yamaguchi, Tokyo (JP);
Keiichi Imamura, Tokyo (JP);
Norihito Hanafusa, Kanagawa (JP);
Taichiro Tsujimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/299,674

(22) Filed: Oct. 21, 2016

(65) Prior Publication Data
US 2017/0186399 A1 Jun. 29, 2017

(30) Foreign Application Priority Data
Dec. 28, 2015 (JP) .................... 2015-256956

(51) Int. Cl.
*G09G 5/00* (2006.01)
*G04G 9/00* (2006.01)
(Continued)

(52) U.S. Cl.
CPC ............ *G09G 5/003* (2013.01); *G04G 9/007* (2013.01); *G04G 9/0064* (2013.01); *G04G 21/02* (2013.01);
(Continued)

(58) Field of Classification Search
CPC ...... G04B 19/04; G04B 19/22; G04G 9/0064; G04G 9/007; G04G 21/02; G09G 5/003;
(Continued)

(56) References Cited

U.S. PATENT DOCUMENTS 5,258,964 A 11/1993 Koma et al.
8,416,261 B1 * 4/2013 Lawson ............... G04G 9/0076
345/619
(Continued)

FOREIGN PATENT DOCUMENTS

JP  H4-119020 A  4/1992
JP  H5-4089 U  1/1993
(Continued)

OTHER PUBLICATIONS

Japanese Office Action dated Jul. 4, 2017, in a counterpart Japanese patent application No. 2015-256956. (A machine translation (not reviewed for accuracy) attached.).

*Primary Examiner* — Chante E Harrison
(74) *Attorney, Agent, or Firm* — Chen Yoshimura LLP

(57) ABSTRACT

A timepiece wrist terminal includes: a setting processing unit; a location information acquisition unit; a related information acquisition unit; a time difference calculation processing unit; and an output control unit. The setting processing unit acquires a first location. The location information acquisition unit acquires a second location that is different from the first location. The related information acquisition unit acquires information related to the first location. The related information acquisition unit also acquires information related to the second location. The time difference calculation processing unit generates differential information in accordance with the information related to the first location and the information related to the second location. The output control unit controls the output unit so as to display an object that represents the differential information, at least one of attributes of the object displayed being continuously varied in accordance with a differential amount representing the differential information.

17 Claims, 8 Drawing Sheets

US 10,460,696 B2

Page 2

(51) Int. Cl.
*G09G 5/38* (2006.01)
*G06T 3/40* (2006.01)
*G04G 21/02* (2010.01)

(52) U.S. Cl.
CPC .............. *G06T 3/40* (2013.01); *G09G 5/38* (2013.01); *G09G 2340/0464* (2013.01); *G09G 2370/16* (2013.01)

(58) Field of Classification Search
CPC .............. G09G 5/38; G09G 234/0464; G09G 2370/16; G06F 16/287; G06T 3/40; G06T 11/20; G06T 11/206; G06T 11/60
USPC .......................................... 345/418, 619, 660
See application file for complete search history.

(56) References Cited

U.S. PATENT DOCUMENTS

| | | | |
|---|---|---|---|
| 2004/0125311 A1 | 7/2004 | Miyake | |
| 2011/0115805 A1* | 5/2011 | Ahn | G09B 29/106 345/581 |
| 2012/0287162 A1* | 11/2012 | Aminian | G06F 3/0485 345/660 |
| 2012/0313965 A1* | 12/2012 | Mochizuki | G06F 17/30817 345/619 |
| 2013/0002805 A1* | 1/2013 | Andresen | H04N 7/147 348/14.07 |
| 2014/0104991 A1* | 4/2014 | Rochat | G04B 5/165 368/11 |
| 2014/0303890 A1* | 10/2014 | Jun | B60K 37/06 701/532 |
| 2015/0049033 A1* | 2/2015 | Kim | G06F 3/041 345/173 |
| 2015/0221121 A1* | 8/2015 | Morishita | G06T 11/206 345/419 |
| 2015/0253740 A1 | 9/2015 | Nishijima et al. | |
| 2016/0034148 A1* | 2/2016 | Wilson | G06F 3/04842 715/835 |
| 2016/0034152 A1* | 2/2016 | Wilson | G06F 3/04845 715/835 |
| 2016/0117372 A1* | 4/2016 | Krafft | G06F 17/30572 715/739 |
| 2017/0147988 A1* | 5/2017 | Shin | G06Q 10/1095 |
| 2017/0357217 A1* | 12/2017 | Raymann | G04F 3/06 |
| 2017/0357427 A1* | 12/2017 | Wilson | G04G 9/02 |
| 2018/0101142 A1* | 4/2018 | Dudhat | G04G 9/02 |
| 2018/0181081 A1* | 6/2018 | Imamura | G04G 99/006 |
| 2018/0275619 A1* | 9/2018 | Sawada | G04G 17/04 |

FOREIGN PATENT DOCUMENTS

| | | |
|---|---|---|
| JP | 2004-212427 A | 7/2004 |
| JP | 2005-121480 A | 5/2005 |
| JP | 2009-541772 A | 11/2009 |
| JP | 2010-32407 A | 2/2010 |
| JP | 2010-66245 A | 3/2010 |
| JP | 2012-83107 A | 4/2012 |
| JP | 2015-169500 A | 9/2015 |

* cited by examiner

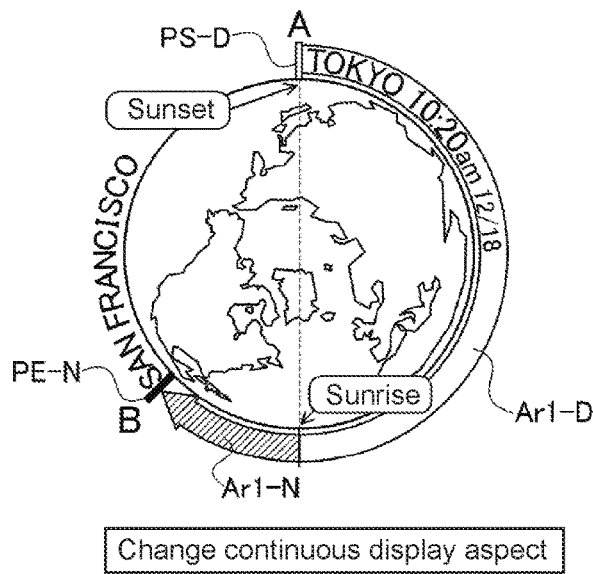
FIG. 8
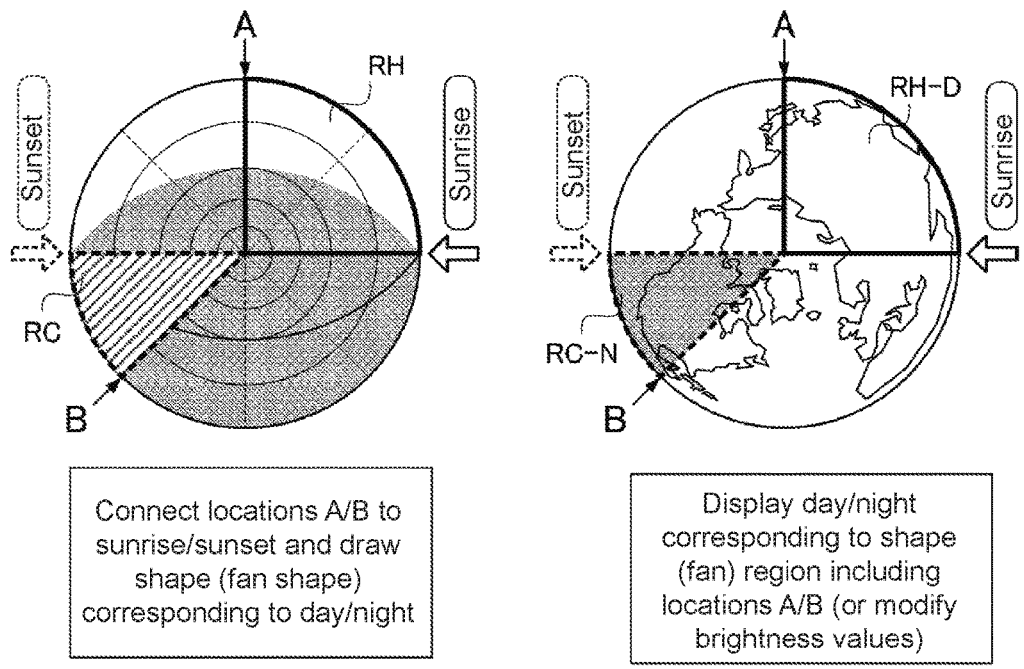
FIG. 9A
FIG. 9B

ELECTRONIC DEVICE FOR REPORTING INFORMATION, DISPLAY METHOD THEREFOR, AND RECORDING MEDIUM

BACKGROUND OF THE INVENTION

Technical Field

The present invention relates to an electronic device that reports information, a display method therefor, and a recording medium, and more particularly, to a timepiece, such as a wrist watch, displaying time.

Background Art

As disclosed in Japanese Patent Application Laid-Open Publication No. 2010-66245, technology currently exists in which times for a plurality of points across the globe are displayed around the circumference of a dial of a timepiece (see Patent Document 1). In the technology disclosed in Patent Document 1, the location and current time information for a plurality of cities are simultaneously displayed on one dial by displaying a time scale and a longitude scale around the circumference of the dial of the timepiece and displaying arrows in locations around the circumference that correspond to the longitudes of a selected plurality of cities.

SUMMARY OF THE INVENTION

In the technology disclosed in Patent Document 1, however, the display may not be very intuitive and readily understandable by some users. Accordingly, the present invention is directed to an electronic device that reports information, such as a timepiece, that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic device, including: a display unit; and a processor connected to the display unit, the processor being configured to: acquire first location information; acquire second location information that differs from the first location information; acquire first information related to the first location information; acquire second information related to the second location information; generate differential information representing a difference between the first information related to the first location information and the second information related to the second location information; and control the display unit so as to display an object on the display unit that represents the differential information, at least one of attributes of the object displayed being continuously varied in accordance with a differential amount representing the differential information.

In another aspect, the present disclosure provides a display method to be performed by an electronic device having a processor, including: causing the processor to: acquire first location information; acquire second location information that is different from the first location information; acquire first information related to the first location information; acquire second information related to the second location information; generate differential information representing a difference between the first information related to the first location information and the second information related to the second location information; and control a display unit so as to display an object on the display unit that represents the differential information, at least one of attributes of the object displayed being continuously varied in accordance with a differential amount representing the differential information.

In another aspect, the present disclosure provides a non-transitory computer-readable storage medium having stored therein a program executable by an electronic device having a processor, the program stored in the storage medium causing the processor to perform the following: acquire first location information; acquire second location information that is different from the first location information; acquire first information related to the first location information; acquire second information related to the second location information; generate differential information representing a difference between the first information related to the first location information and the second information related to the second location information; and control a display unit so as to display an object on the display unit that represents the differential information, at least one of attributes of the object displayed being continuously varied in accordance with a differential amount representing the differential information.

It is to be understood that both the foregoing general description and the following detailed description are exemplary and explanatory, and are intended to provide further explanation of the invention as claimed.

BRIEF DESCRIPTION OF THE DRAWINGS

FIG. 8 is a schematic diagram for explaining a depiction example other than the day-night depiction in the map display region R2.

FIG. 9A is a schematic diagram for explaining a depiction example other than the day-night depiction in the map display region R2.

FIG. 9B is a schematic diagram for explaining a depiction example other than the day-night depiction in the map display region R2.

DETAILED DESCRIPTION OF EMBODIMENTS

Embodiments of the present invention will be explained below using the drawings.

Figure 1:
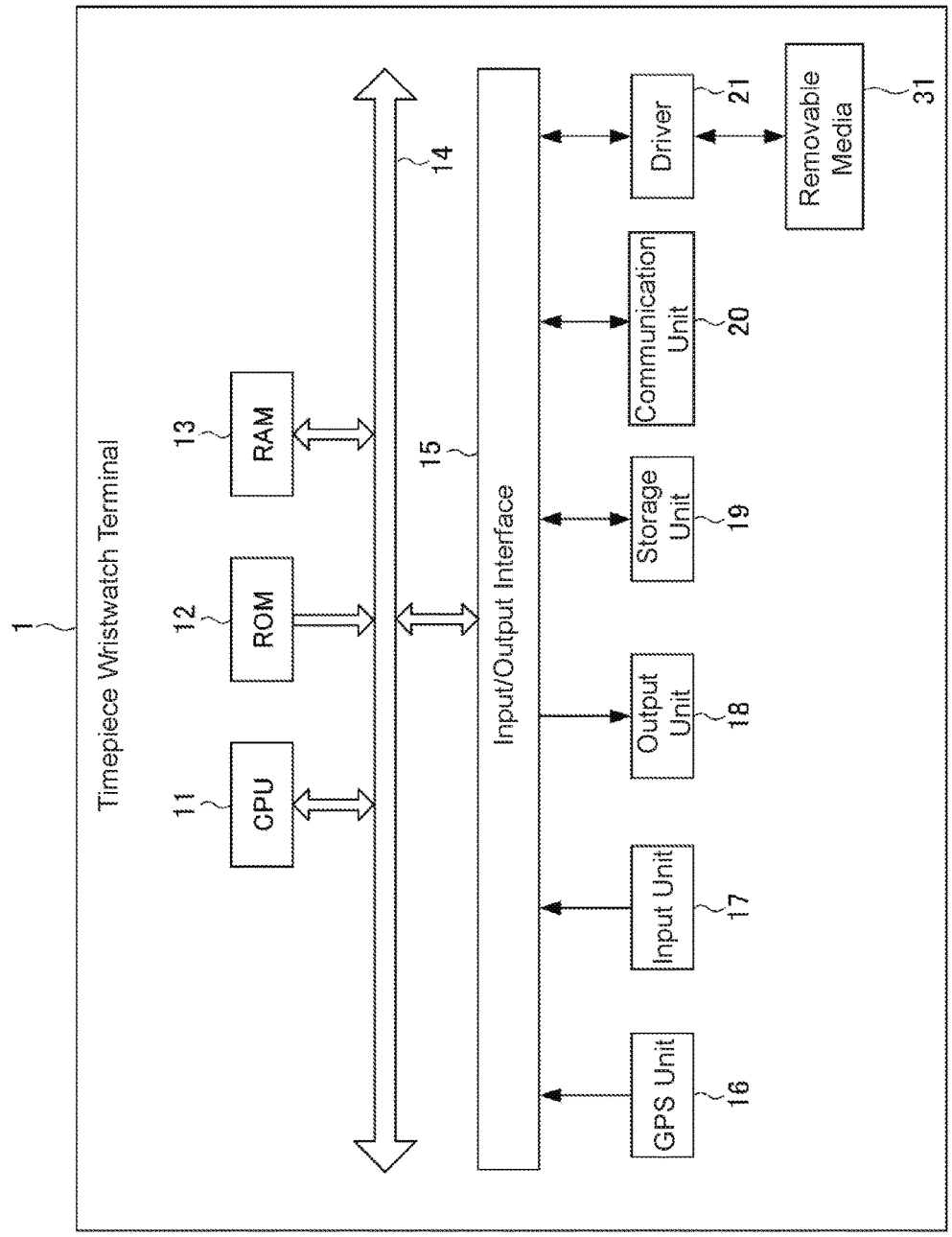
FIG. 1 is a block diagram that shows a hardware configuration of a timepiece wrist terminal 1 according to an embodiment of an electronic device of the present invention.

FIG. 1 is a block diagram that shows a hardware configuration of a timepiece wrist terminal 1 (electronic device) according to an embodiment of an electronic device of the present invention.

The timepiece wrist terminal 1 is configured as a smartwatch, for example.

As shown in FIG. 1, the timepiece wrist terminal 1 includes: a CPU (central processing unit) 11; ROM (read only memory) 12; RAM (random access memory) 13; a bus 14; an input/output interface 15; a GPS unit 16; an input unit 17; an output unit 18; a storage unit 19; a communication unit 20; and a drive 21.

The CPU 11 executes various types of processing in accordance with programs recorded in the ROM 12 or programs loaded into the RAM 13 from the storage unit 19.

The RAM 13 appropriately stores data and the like necessary for the CPU 11 to execute various types of processing.

The CPU 11, the ROM 12, and the RAM 13 are connected to each other via the bus 14. The input/output interface 15 is also connected to the bus 14. The GPS unit 16, the input unit 17, the output unit 18, the storage unit 19, the communication unit 20, and the drive 21 are connected to the input/output interface 15.

The GPS unit 16 is formed of various types of sensors such as GPS (global positioning system) sensors, acceleration sensors, and gyro sensors. It is possible to acquire from the GPS unit 16 information related to the movement of the timepiece wrist terminal 1, such as location information and orientation information.

The input unit 17 is formed of various types of buttons and the like, and inputs various types of information in accordance with instruction operations by a user.

The output unit 18 is formed of a display, a speaker, and the like, and outputs images and sound.

The storage unit 19 is formed of a hard disk, DRAM (dynamic random access memory), or the like, and stores various types of image data.

The communication unit 20 is configured so as to be able to carry out near-field wireless communication such as Bluetooth (registered trademark), for example, and controls communication with other timepiece wrist terminals 1.

Removable media 31 constituted of a magnetic disk, an optical disk, a magneto-optical disk, a semiconductor memory, or the like, is appropriately mounted on the drive 21. Programs read from the removable media 31 by the drive 21 are installed in the storage unit 19 as necessary. The removable media 31 can also store various types of data, such as image data stored in the storage unit 19, in a manner similar to the storage unit 19.

The timepiece wrist terminal 1 configured in such a manner has the function of quantitatively displaying a time difference between specified cities at the periphery of the display screen.

In addition, the timepiece wrist terminal 1 has the function of being able to display a globe using a design that looks down on the globe from a prescribed direction, and being able to superimpose and display a day-night display that corresponds to the current time such that the day-night display matches up with the design.

Figure 2:
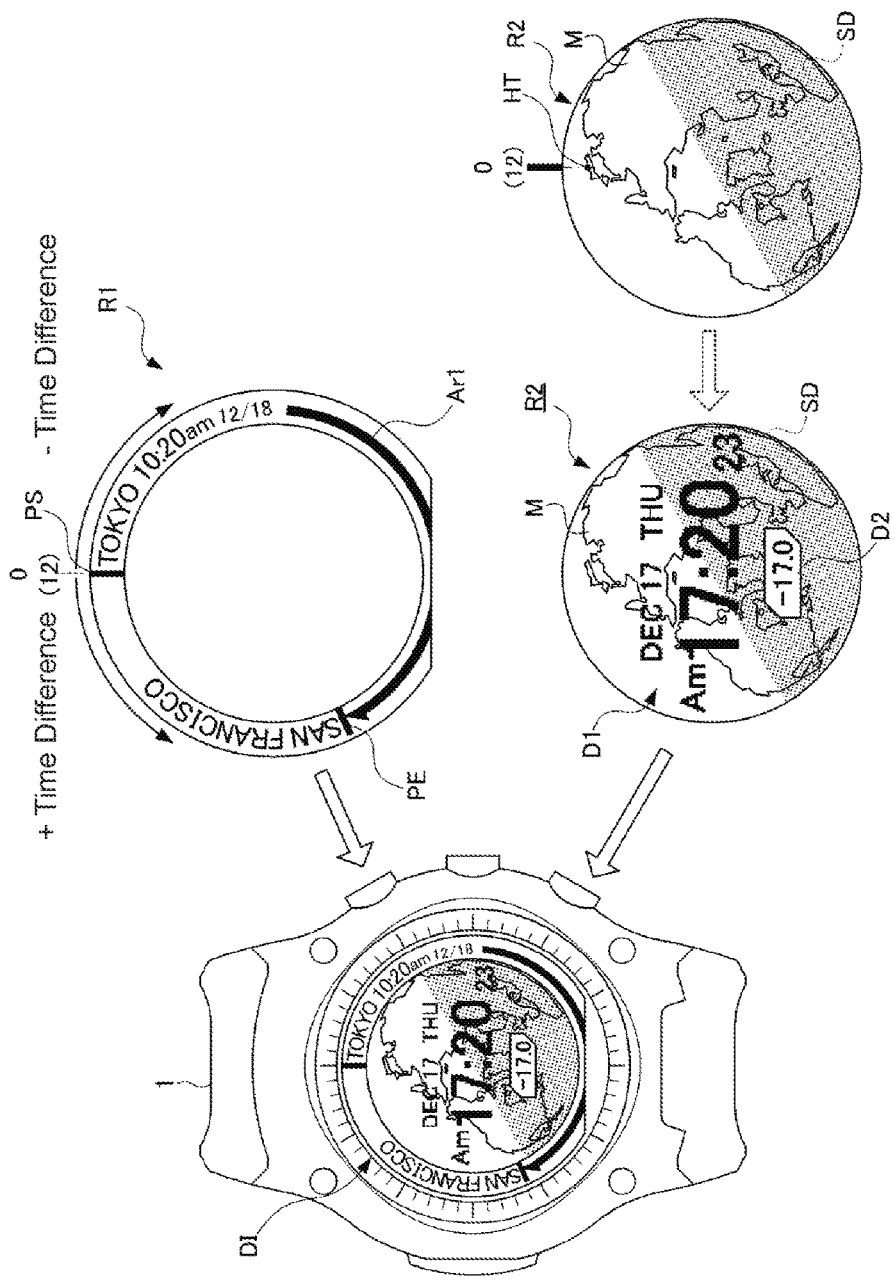
FIG. 2 is a schematic diagram for explaining a display example on a screen of the present embodiment.

FIG. 2 is a schematic diagram for explaining a display example on the screen of the present embodiment.

As shown in FIG. 2, a display screen DI is formed of: a time difference display region R1 that is formed in a ring shape along the external periphery of the display screen DI; and a map display region R2, which is formed in a circular shape to the inside of the time difference display region R1.

In the time difference display region R1, a time difference is displayed that is a time difference between a pre-recorded city (hereafter referred to as a "hometown") that is used as a reference for the time difference and a city (hereafter referred to as a "current city") that is the source of the time difference with the hometown and is where the sensor unit-type timepiece terminal 1 is located.

As shown in FIG. 2, in the present embodiment, a starting point PS that represents the hometown is displayed in the midnight position (the 12 o'clock position of the timepiece display) in a 24 hour display (in a case in which display is performed by dividing 360° into 24 equal portions), and an end point PE for the current city is displayed in a position in accordance with the time difference with the hometown. An arrow Ar1 is displayed between the starting point PS and the end point PE in accordance with the time difference between the hometown and the current city.

When the hometown time is used as the reference and the time difference between the hometown and the current city is negative, the arrow Ar1 is drawn in a clockwise direction from the starting point PS. If the time difference is positive, the arrow Ar1 is drawn in a counterclockwise direction from the starting point PS.

If the time difference between the hometown and the current city is such that the current city time is 17 hours behind the hometown time, the end point PE will be located 17 hour marks from "0" and indicated by a clockwise arrow, for example. If the time difference between the hometown and the current city is such that the current city time is 17 hours ahead of the hometown time, the end point PE will be located 7 hour marks from "0" and indicated by a counterclockwise arrow. Time differences (both times that are ahead of and behind the hometown time) are not limited to being displayed by the direction of an arrow, and the terminal 1 may be configured such that time differences are displayed using different colors in accordance with whether the time difference is positive or negative.

Furthermore, the city name of the hometown and the date and time in the hometown are displayed near the starting point PS, and the city name of the current city is displayed near the end point PE.

In the present example, the hometown is Tokyo, the current city is San Francisco, and the time difference between Tokyo and San Francisco is such that San Francisco is 17 hours behind Tokyo (−17 hours). Thus, the starting point PS, which represents Tokyo ("TOKYO"), is displayed at the "0" hour mark, the end point PE, which represents San Francisco ("SAN FRANCISCO"), is displayed at a location 17 hour marks from the starting point PS in the clockwise direction, and the clockwise arrow Ar1 is also displayed.

In this manner, by displaying the time difference via the graphic representation of the arrow Ar1 between the starting point PS and the end point PE, it is possible for the user to see the time difference as a continuous analog quantity, and it is also possible to cause the user to intuitively grasp the time difference between the current city and the hometown. The display screen of the present embodiment has a substantially circular shape; thus, by quantitatively displaying a time difference between specified cities at the periphery of the display screen, it is possible to cause the user to visualize the periphery of the screen as a 24 hour period, and it is also possible to cause the user to intuitively grasp the time difference correctly.

The above-described displaying scheme is one of many possible schemes covered by the features of "displaying an object on the display unit that represents differential information, at least one of attributes of the object displayed being continuously varied in accordance with a differential amount representing differential information." In the above embodiment, the arrow Ar1 corresponds to the "object"; the length/position of the arrow Ar1 corresponds to the "attribute of the object that is continuously varied"; and the time difference between the two cities corresponds to the "differential amount representing differential information." It is apparent that similar associations can be made for various embodiments described below.

In addition, the display configuration of the arrow Ar1 may be modified in accordance with the size of the time difference. For example, the terminal 1 may be configured such that when the time difference between cities is large, the arrow Ar1 may be displayed so as to be narrower, and when the time difference between cities is small, the arrow Ar1 may be displayed so as to be wider.

Furthermore, the color and brightness of the arrow Ar1 may be modified in accordance with the size of the time difference between the cities. For example, the terminal 1 may be configured such that when the time difference between cities is large, the arrow Ar1 may be displayed such that the color thereof is thinner and the brightness is decreased, and when the time difference between the cities is small, the arrow Ar1 may be displayed such that the color thereof is thicker and the brightness is increased.

In the map display region R2, the following are displayed: a map M that looks down on the globe from a prescribed direction; and a current date/time display D1 and a numerical value D2 for the time difference between the hometown and the current city, with the display D1 and the value D2 being superimposed on the map M.

In the present embodiment, the map M is displayed in a design that looks down on the globe from due north and has the North Pole at the center, leading to the Northern Hemisphere region being displayed.

In addition, in the map M, the location of a hometown HT is displayed in the midnight position (the 12 o'clock position of the timepiece display) of the 24 hour display.

Furthermore, in the map M, a display that depicts the difference between day and night is displayed for the current time. In the present embodiment, a shadow SD is displayed for night so as to depict darkness. The displayed shadow SD is configured so as to be displayed as lighter in regions that are transitioning between day and night.

The day-night display calculates the sunrise and sunset times for various points based on the latitude, longitude, and altitude of the current city, calculates the time difference with the current time for each of the various points, calculates angles corresponding to the calculated time differences, and realizes a day-night depiction on the map M by displaying the shadow SD in the locations in which the time is later than the sunset time.

In this manner, by depicting day-night on the map M in accordance with the current time, it is possible for a user intuitively determine the hometown time and the current position (day-night state) of the hometown within a one day cycle.

There are various methods for drawing the day-night depiction. It is possible to draw the night shadow by using one point (city) as a reference, and then drawing the approximate shape of the shadow based on the time information for the reference point, for example.

In the present embodiment, in order to draw the shadow more accurately, the shadow is drawn based on differential information between the time information and sunrise/sunset times for a plurality of points.

In addition, for the day-night depiction in the map display region R2, the edge of the shadow SD can be depicted as a straight line, as in the example in FIG. 2. However, it is also possible to prioritize the image of a spherically-shaped map (a globe), and depict the edge of the shadow SD so as to curve moving towards the center of the map.

The shadow in the day-night depiction can be drawn using the following method, for example.

Figure 3:
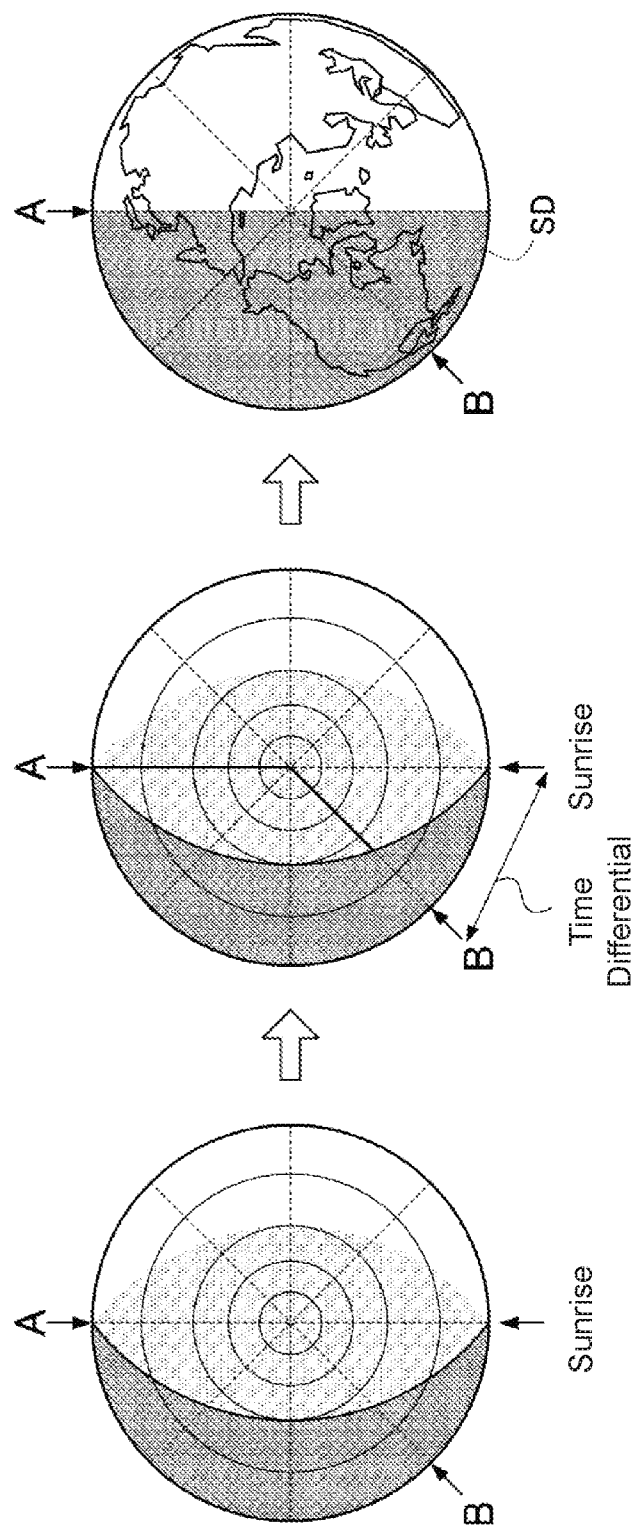
FIG. 3 is a schematic diagram for explaining a drawing method of a day-night depiction in a map display region R2.

FIG. 3 is a schematic diagram for explaining a drawing method of the day-night depiction in the map display region R2. This method assumes that the two locations (the hometown and the current city) are located in the same hemisphere. In addition, as shown FIG. 3, the present example will be explained using an example in which the time at a point A (the hometown) is the same as the sunset time.

(1) The sunset/sunrise time information for two respective points is acquired, and the time difference (time amount) between the current time and the sunrise/sunset time (whichever is closest to the current time) is calculated. In the present example, there is no time difference (time amount) for point A since the time matches the sunset time, while there is a time difference of a few hours between the time at point B and the sunrise time.

(2) The calculated time difference (time amount) is converted to an angle on a spherical map (globe).

(3) In accordance with the calculated angle, exact sunrise and sunset locations are calculated. In this case, as the difference in latitude increases, the drawing changes from a perfect semicircle to a crescent shape in accordance with the difference in latitude. Since the relationship (time difference, angle) between the location of the shadow and the respective locations of the two points is correct, the drawing appears unnatural; however, it is possible in a general sense to intuitively understand the day-night state and amount of time to sunrise/sunset for the two points. As a result, it is possible to intuitively estimate, based on the location of the shadow and the locations of the two points, the amount of time to the sunrise/sunset time.

However, it is difficult to create a drawing for a case in which the difference in latitude is particularly extreme and a location is experiencing a period in which sunrise and sunset don't exist, such as a polar night or the midnight sun. Thus, if it is determined that making such a drawing will be difficult, the shadow may not be drawn, and another type of processing, such as displaying the day-night state of the two respective points via text, may be carried out.

Figure 4:
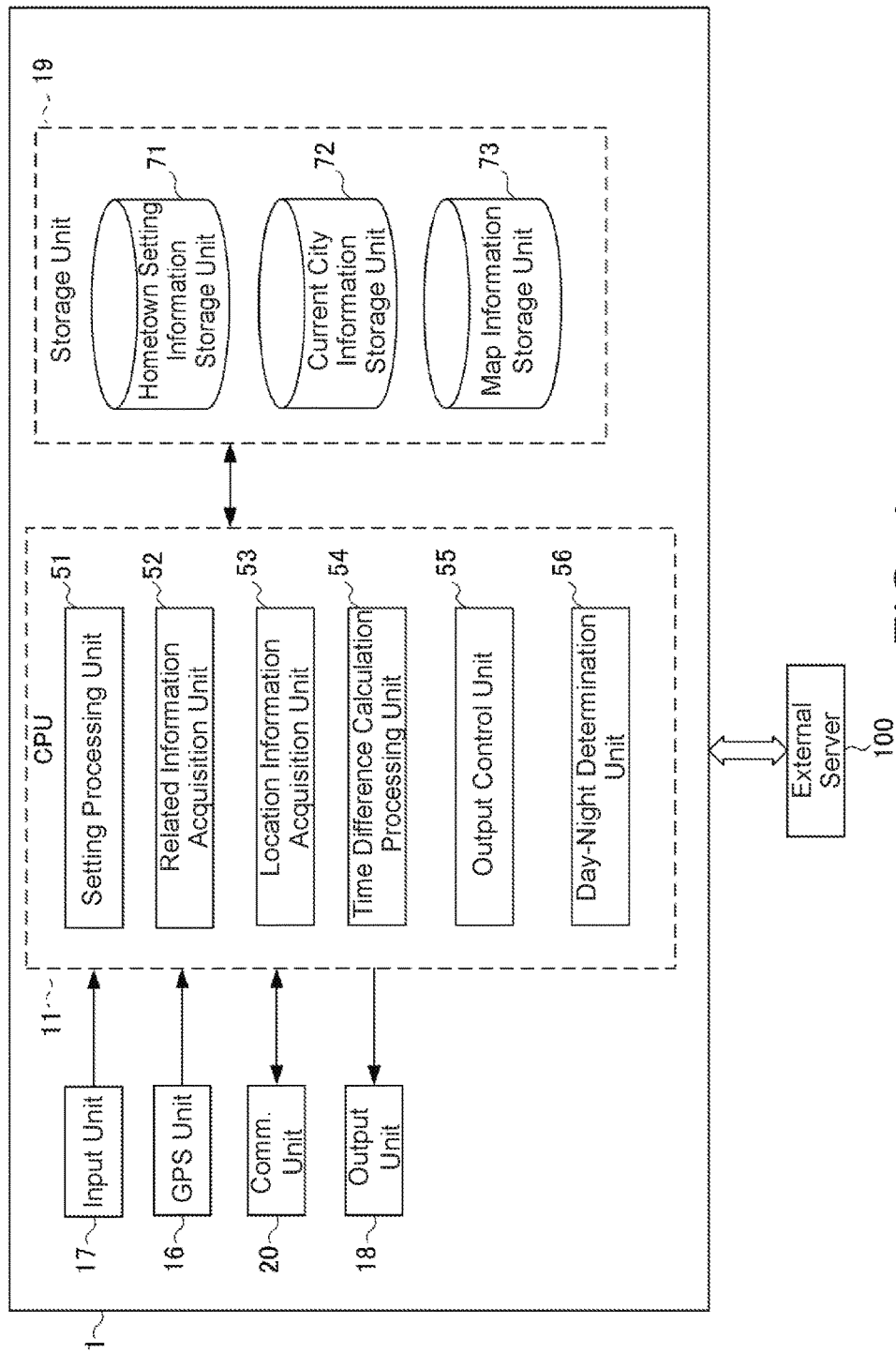
FIG. 4 is a functional block diagram that shows, from among the functional configurations of the timepiece wrist terminal 1 of FIG. 1, a functional configuration for carrying out time difference display processing and day-night display processing.

FIG. 4 is a functional block diagram that shows, from among the functional configurations of the timepiece wrist terminal 1 in FIG. 1, a functional configuration for carrying out time difference display processing and day-night display processing.

Time difference display processing involves a series of processes that display a time difference in the time difference display region R1 based on the hometown and current city information.

Day-night display processing involves a series of processes that display day and night so as to match up with the map in the map display region R2 based on the hometown and current city information.

As shown in FIG. 4, the following units function in the CPU 11 when time difference display processing is carried out: a setting processing unit 51; a related information acquisition unit 52; a location information acquisition unit 53; a time difference calculation processing unit 54; and an output control unit 55.

In addition, a hometown setting information storage unit 71 and a current city information storage unit 72 are provided in one area of the storage unit 19.

Setting information (the city name of the hometown, for example) for the hometown that has been set by the user is stored in the hometown setting information storage unit 71.

Current city information (the city name of the current city, for example) corresponding to the acquired location information is stored in the current city information storage unit 72.

The setting processing unit 51 carries out processing that sets the hometown according to the preference of the user.

The setting processing unit 51 determines whether or not there is hometown setting information, for example.

The setting processing unit 51 then sets the hometown settings via a hometown setting operation performed by the user via the input unit 17. The hometown setting information is stored in the hometown setting information storage unit 71.

The related information acquisition unit 52 acquires information (hereafter referred to as "related information") that is related to the locations (the hometown and current city) such as the time zone, time information, and the like.

The related information acquisition unit 52 acquires related information for the hometown, such as the time zone and time information for the hometown, from an external server 100 via the communication unit 20, for example.

The related information acquisition unit 52 also acquires related information for the specified current city, such as the time zone and time information for the current city, from the external server 100 via the communication unit 20.

In the present embodiment, the related information for the hometown/current city was acquired from the external server 100 so as to acquire the latest hometown related information; the related information may also be pre-stored, however.

The location information acquisition unit 53 acquires location information from the GPS unit 16. The location information acquisition unit 53 then specifies the current city based on the acquired location information.

The time difference calculation processing unit 54 carries out processing that calculates the time difference between the hometown and the current city.

The time difference calculation processing unit 54 calculates the time difference based on the acquired time information for the hometown and current city, for example. Alternatively, even if there is no hometown time information, it is possible to calculate the time difference by comparing the acquired time zone for the hometown and the acquired time zone information and time information for the current city. Similarly, it is possible to calculate the time difference if the time zone for the current city and the time information and time zone for the hometown have been acquired.

The time difference calculation processing unit 54 also determines whether or not the calculated time difference meets or exceeds a threshold value. The threshold value used in this determination may be set to a desired value by the user.

The time difference calculation processing unit 54 then calculates an angle used in drawing a difference in accordance with this time difference. In the present embodiment, the calculated angle used in drawing the difference is an angle in which 360 degrees is matched to a 24 hour period so as to match a rotational depiction of the globe. In other words, the angle used for drawing a difference corresponding to a time difference of one hour is 15 degrees. For example, when Tokyo is the hometown and San Francisco is the current city, San Francisco is 17 hours behind Tokyo and the angle for drawing this difference is 15 degrees×17 hours, which equals 255 degrees (approximately 8 o'clock on the timepiece display). If the time difference is such that the current city is ahead of the hometown, an angle will be calculated in the opposite direction (the counterclockwise direction).

The output control unit 55 controls the output unit 18 so as to carry out time difference display in the time difference display region R1.

The output control unit 55 controls the output unit 18 such that time difference display is carried out, for example. As shown in FIG. 2, in the present embodiment, the time difference display displays the starting point PS that represents the hometown in the midnight position (the 12 o'clock position of the timepiece display) in a 24 hour display and displays the end point PE for the current city in a time position that corresponds to the time difference with the hometown. The arrow Ar1 is displayed between the starting point PS and the end point PE in accordance with the direction of the time difference with the hometown. Furthermore, the city name of the hometown and the date and time of the hometown are displayed near the starting point PS, and the city name of the current city is displayed near the end point PE.

As shown in FIG. 4, the following units function in the CPU 11 when day-night display processing is carried out: the related information acquisition unit 52; a day-night determination unit 56; and the output control unit 55.

In addition, a map information storage unit 73 is provided in one area of the storage unit 19.

Map information is stored in the map information storage unit 73. In the present embodiment, a map that is a view of the globe from due north and that is centered on the North Pole is drawn using this map information.

The related information acquisition unit 52 acquires related information for the hometown and the current city.

The related information acquisition unit 52 acquires the times for the hometown and current city and times for sunrise/sunset from the external server 100 via the communication unit 20, for example.

The day-night determination unit 56 performs day-night determination for prescribed points at a prescribed time.

The day-night determination unit 56 determines the day-night state based on the difference between the current time and the sunrise/sunset times, for example. The day-night determination unit 56 is able to determine the day-night state for the entire globe at the current time via the difference between the current time and the sunset/sunrise times.

The output control unit 55 controls the output unit 18 so as to perform day-night display in the map display region R2.

The output control unit 55 controls the output unit 18 so as to display in the map display region R2 a map stored in the map information storage unit 73 and points for the hometown and current city, for example. The current city and the hometown are displayed in coordinate locations that correspond to the map (in the present embodiment, a map of the Northern Hemisphere centered on the North Pole), for example.

In addition, the output control unit 55 controls the output unit 18 so as to draw the shadow representing night on the map in accordance with the day-night state at the points (the hometown and the current city).

Then, as shown in FIG. 2, the output control unit 55 controls the output unit 18 so as to adjust the orientation of the map and then display the map such that the hometown matches with the 12 o'clock direction.

In the present embodiment, the drawing of the map M was displayed such that the hometown matched the 12 o'clock direction. The invention is not limited to such a configuration, however. The current city may be matched up with the 12 o'clock direction, for example. Also in the present embodiment, the North Pole was displayed at the center of the map, but display may be performed such that a desired city (the hometown/the current city) is displayed at the center.

Figure 5:
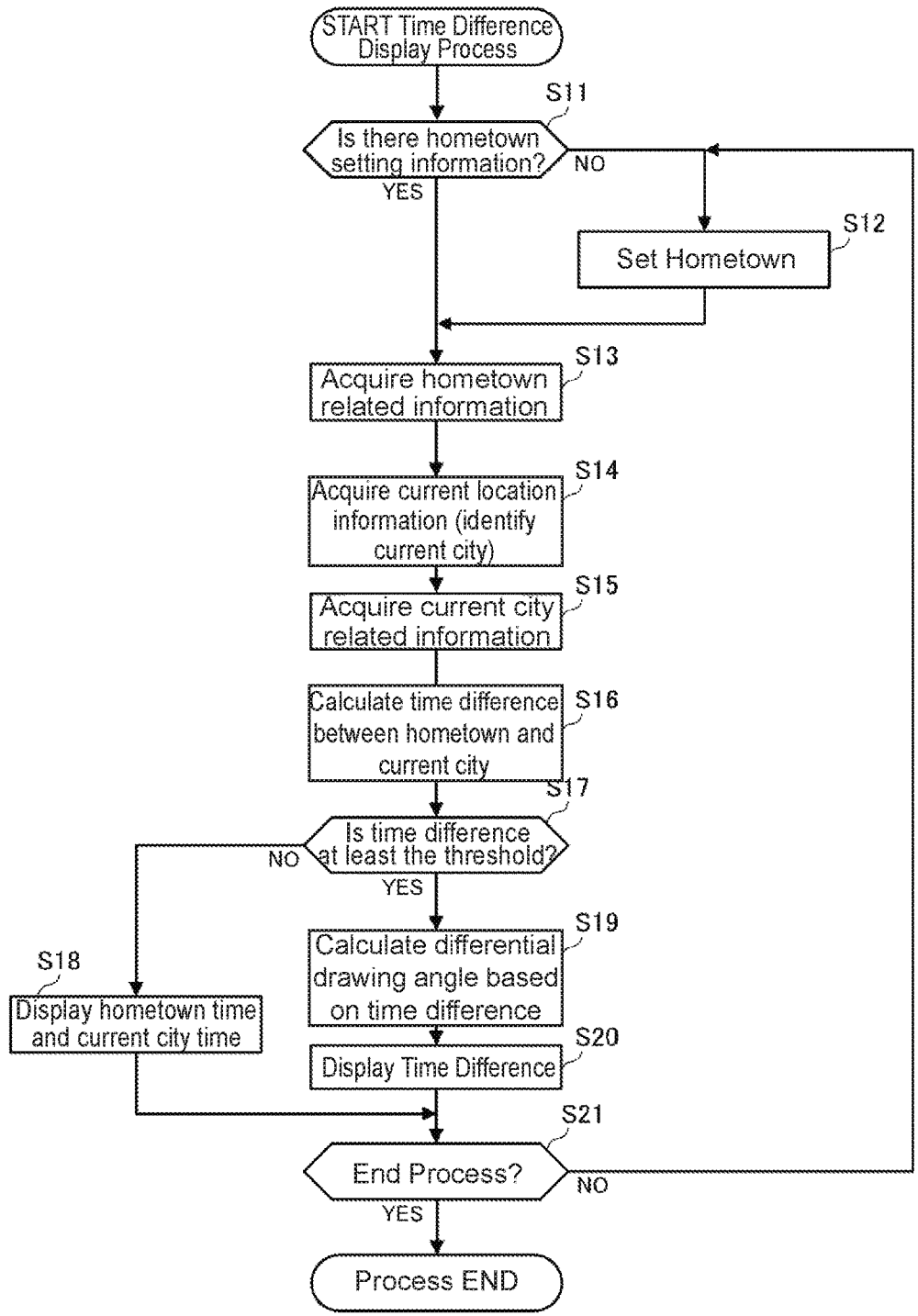
FIG. 5 is a flow chart for explaining the flow of the time difference display processing carried out by the timepiece wrist terminal 1 of FIG. 1 that includes the functional configuration of FIG. 4.

FIG. 5 is a flow chart for explaining the flow of the time difference display processing carried out by the timepiece wrist terminal 1 of FIG. 1 that includes the functional configuration of FIG. 4.

Time difference display processing is shown as one of the functions of the timepiece display, and begins after a timepiece display processing starting operation is received from the user via the input unit 17.

During Step S11, the setting processing unit 51 determines whether or not there is any hometown setting information.

If there is hometown setting information, the setting processing unit 51 determines "YES" during Step S11 and processing proceeds to Step S13.

If there is no hometown setting information, the setting processing unit 51 determines "NO" during Step S11 and processing proceeds to Step S12.

During Step S12, the setting processing unit 51 sets the hometown settings via a hometown setting operation performed by the user via the input unit 17. The hometown setting information is stored in the hometown setting information storage unit 71.

During Step S13, the related information acquisition unit 52 acquires related information for the hometown, such as the time zone and time information for the hometown, from the external server 100 via the communication unit 20. In the present embodiment, the related information for the hometown may utilize information acquired from the external server 100 so as to acquire the latest related information for the hometown. Alternatively, the related information for the hometown may be configured so as to utilize information related to the hometown from related information pre-stored in the storage unit.

During Step S14, the location information acquisition unit 53 acquires location information from the GPS unit 16. The location information acquisition unit 53 then specifies the current city based on the acquired location information.

During Step S15, the related information acquisition unit 52 acquires related information for the specified current city, such as the time zone and time information for the current city, from the external server 100 via the communication unit 20. In the present embodiment, the related information for the current city may utilize information acquired from the external server 100 so as to acquire the latest related information for the current city. Alternatively, the related information for the current city may be configured so as to utilize information corresponding to the current city from related information pre-stored in the storage unit.

During Step S16, the time difference calculation processing unit 54 calculates a time difference based on the acquired time information for the hometown and current city.

During Step S17, the time difference calculation processing unit 54 determines whether or not the calculated time difference meets or exceeds a threshold value.

If the time difference does not meet or exceed a prescribed amount of time, the time zone calculation processing unit 54 determines "NO" during Step S17 and processing proceeds to Step S18.

During Step S18, the output control unit 55 controls the output unit 18 so as to display the hometown time and the current city time in the time difference display region R1. Thereafter, processing proceeds to Step S21.

Conversely, if the time difference meets or exceeds the prescribed amount of time, the time zone calculation processing unit 54 determines "YES" during Step S17 and processing proceeds to Step S19.

During Step S19, the time difference calculation processing unit 54 calculates an angle used in drawing a difference in accordance with this time difference. In the present embodiment, the calculated angle used in drawing the difference is an angle where 360 degrees is equal to 24 hours. In other words, the angle used for drawing a difference corresponding to a time difference of one hour is 15 degrees. For example, when Tokyo is the hometown and San Francisco is the current city, San Francisco is 17 hours behind Tokyo and the angle for drawing this difference becomes 15 degrees×17 hours, which equals 255 degrees (approximately 8 o'clock on the timepiece display). If the time difference is such that the current city is ahead of the hometown, an angle will be calculated in the opposite direction (the counterclockwise direction).

During Step S20, the output control unit 55 controls the output unit 18 so as to perform time difference display. As shown in FIG. 2, in the present embodiment, the time difference display displays the starting point PS that represents the hometown in the midnight position (the 12 o'clock position of the timepiece display) of a 24 hour display and displays the end point PE for the current city in a time position that corresponds to the time difference with the hometown. The arrow Ar1 is displayed between the starting point PS and the end point PE in a direction that is in accordance with the time difference with the hometown. Furthermore, the city name of the hometown and the date and time of the hometown are displayed near the starting point PS, and the city name of the current city is displayed near the end point PE.

During Step 21, the CPU 11 determines whether or not to end time difference display processing when a prescribed period of time has elapsed or a processing completion operation was performed by the user via the input unit 17.

If processing will not be ended, the CPU 11 determines "NO" during Step S21, processing returns to Step S12, hometown setting and the like is once again carried out, and time difference display is performed.

If processing will be ended, the CPU 11 determines "YES" during Step S21, and time difference display processing is ended.

The terminal 1 can be configured so as to transition to sleep mode, for example, after time difference display processing has been ended, and in such a case, the terminal 1 may be configured so as to modify the display so as to suppress the color, luminance, and brightness during sleep mode. In addition, display modification is not limited to being performed during sleep mode, and may be performed according to the remaining battery power or the like.

Figure 6:
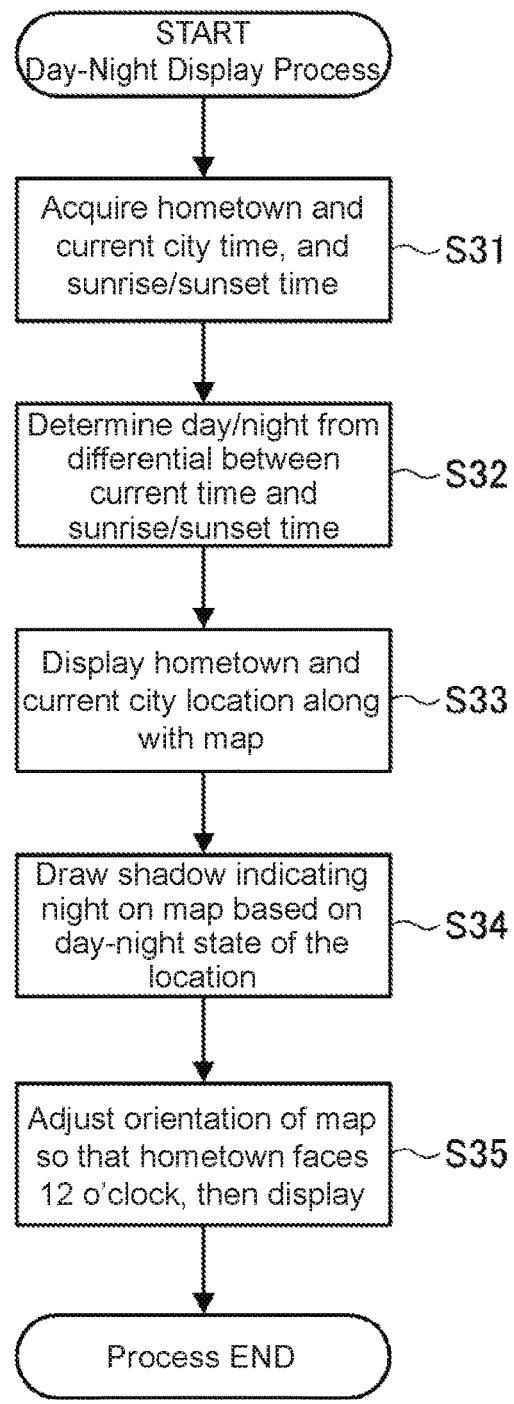
FIG. 6 is a flow chart for explaining the flow of the day-night display processing carried out by the timepiece wrist terminal 1 of FIG. 1 that includes the functional configuration of FIG. 4.

FIG. 6 is a flow chart for explaining the flow of the day-night display processing carried out by the timepiece wrist terminal 1 of FIG. 1 that includes the functional configuration of FIG. 4.

Day-night display processing is shown as one of the functions of the timepiece display, and begins after a timepiece display processing starting operation is received from the user via the input unit 17.

During Step S31, the related information acquisition unit 52 acquires the times and sunrise/sunset times for the hometown and current city, respectively, from the external server 100 via the communication unit 20.

During Step S32, the day-night determination unit 56 determines day and night for the various points based on the difference between the current time and the sunrise/sunset times. The day-night determination unit 56 is able to determine the day-night state for the entire globe at the current time via the difference between the current time and the sunset/sunrise times.

During Step S33, the output control unit 55 controls the output unit 18 so as to display in the map display region R2 a map stored in the map information storage unit 73 and the points for the hometown and current city. The current city and the hometown are displayed in coordinate locations that correspond to the map (in the present embodiment, a map of the Northern Hemisphere centered on the North Pole), for example.

During Step S34, the output control unit 55 controls the output unit 18 so as to draw a shadow representing night on the map in accordance with the day-night state of the points (the hometown and the current city).

During Step S35, the output control unit 55 controls the output unit 18 so as to adjust the orientation of the map and then display the map such that the hometown matches the 12 o'clock direction. Thereafter, day-night display processing ends. In the present embodiment, the drawing of the map M was displayed such that the hometown matched the 12 o'clock direction. The present invention is not limited to such a configuration, however. The current city may be matched up with the 12 o'clock direction, for example. Also in the present embodiment, display was performed with the North Pole being at the center of the output unit, but display may be performed with a desired city (the hometown/the current city) being displayed at the center of the output unit, for example.

The timepiece wrist terminal 1 can perform the display shown in FIG. 2 by performing the time difference display and day-night display described above, and by further displaying the date/time or the like.

<Modification Examples>

FIGS. 7A to 9B are schematic diagrams for explaining depiction examples other than the day-night depiction in the map display region R2.

Figure 7A:
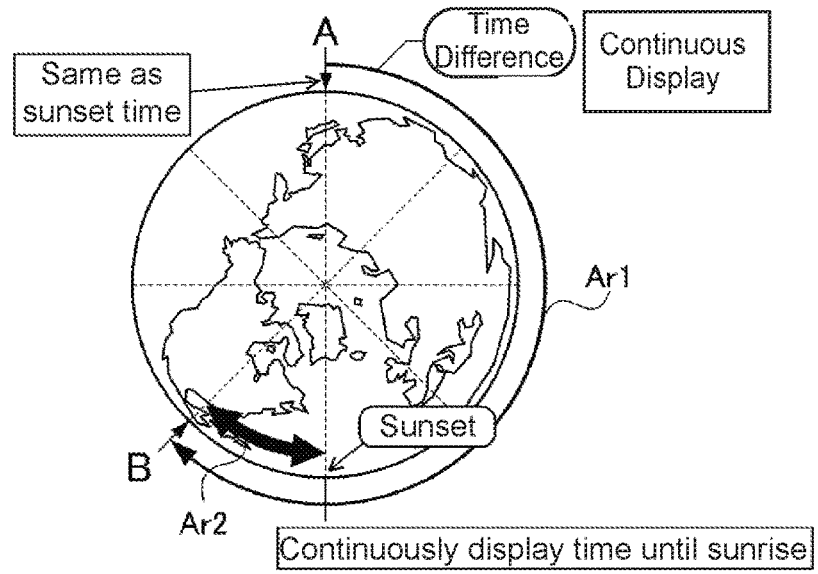
FIG. 7A is a schematic diagram for explaining a depiction example other than the day-night depiction in the map display region R2.

As shown in FIG. 7A, it is possible to make a day-night depiction using a pattern that combines displaying the regular time difference arrow Ar1 and displaying an arrow Ar2 that shows a day-night depiction in parallel. In other words, similar to the time difference arrow Ar1, the time until sunset (sunrise) is depicted using a pattern of a continuous quantity along the circumference, and the time difference with the sunrise is displayed by a different arrow Ar2 that is to the inside of the time difference arrow Ar1.

Figure 7B:
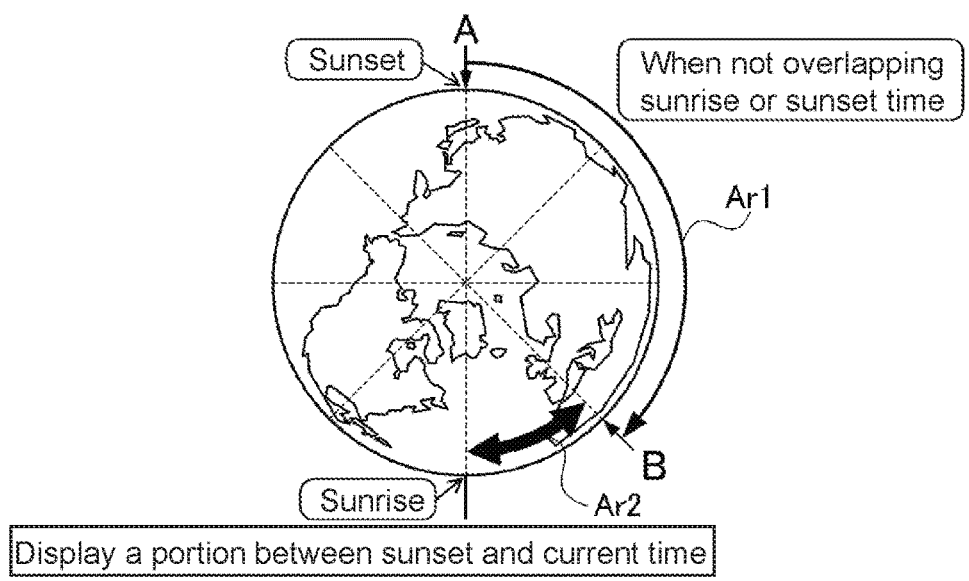
FIG. 7B is a schematic diagram for explaining a depiction example other than the day-night depiction in the map display region R2.

At such time, as shown in FIG. 7B, when the arrow Ar1 does not overlap both the sunrise time and the sunset time, the section between the sunrise and the current time is shown by the arrow Ar2.

In the present example, there is a time difference for only point B, but the terminal 1 may be configured so as to perform similar drawing processing for both points. In addition, when neither the sunset nor sunrise times are overlapped, it is possible to draw the time difference with the sunrise or sunset time (whichever is closer) using a method similar to that shown in FIG. 3 mentioned above.

In addition, as shown in FIG. 8, the arrow Ar1 that shows the time difference may be configured such that the display configuration is modified and displayed in accordance with the day-night state.

The time difference between the current time and the sunrise/sunset time is calculated for the various points, and an angle for illustrating the difference is calculated based on this time difference, for example. The method for calculating this angle uses the above-described calculation method.

After the arrow Ar1 for displaying the time difference display disclosed in the above-mentioned embodiment is drawn on the map M, the display configuration of the arrow Ar1 is modified in accordance with the angle calculated for the day-night depiction. In other words, it is possible to configure the arrow Ar1 such that the region of the arrow Ar1 that resides in daylight becomes a depiction of day, such as Ar1-D, and the region of the arrow Ar1 that resides in the night becomes a depiction of night, such as Ar1-N.

Display processing is performed so as to modify the color, brightness, shape, and the like of the arrow Ar1 in the region corresponding to the angle difference in accordance with the angle difference, which is based on the time difference with the sunrise/sunset time for the various points, for example.

In the present example, similar depiction processing may be performed for both points. The terminal 1 may be configured so as to perform day-night display with the respect to the starting point PS and the end point PE, or the terminal 1 may be configured so as to perform a day-night depiction at specific points such as a starting point PS-D that resides in the daytime and an end point PE-N that resides in the night.

In addition, it is possible to configure the terminal 1 such that the display configuration is modified and displayed in accordance with the time difference between the current time and the sunrise/sunset time for the various points.

A depiction corresponding to day/night is added to the region between the sunrise/sunset and the hometown A/the current city B. As shown in FIG. 9A, for example, instead of displaying arrows, fan-shaped regions RH, RC that join the borders of the sunrise/sunset with the point A and the point B are defined from the center of the globe, and as shown in FIG. 9B, it is possible to display the day-night states to which the regions RH, RC belong by changing the depiction of the regions RH, RC for example. In the present example, the region RH, which extends from point A to sunset, is displayed as a day region RH-D since the region RH resides in the daytime, and the region RC, which extends from the point B to sunrise, is displayed as a night region RC-N since the region RC resides in the night. In such a case, display is not performed using the shadow depiction described above; thus it is not difficult to create the drawing even if the two points are respectively located in the Northern and Southern Hemispheres, and it is possible to intuitively understand the day-night states and the time amounts for the various points.

This display is not limited to a fan-shaped depiction, and the terminal 1 may be configured so as to express another shape depiction, modifications to the luminance value, or the like, for example.

The timepiece wrist terminal 1 configured in the manner described above includes: the setting processing unit 51; the location information acquisition unit 53; the related information acquisition unit 52; the time difference calculation processing unit 54; and the output control unit 55.

The setting processing unit 51 acquires a first location (the hometown).

The location information acquisition unit 53 acquires a second location (the current city) that is different from the first location (the hometown).

The related information acquisition unit 52 acquires information related to the first location (the hometown).

The related information acquisition unit 52 also acquires information related to the second location (the current city).

The time difference calculation processing unit 54 generates differential information in accordance with the information related to the first location and the information related to the second location (the current city).

The output control unit 55 controls the output unit 18 so as to display the differential information as a continuous quantity.

As a result, in the timepiece wrist terminal 1, it is possible to realize a display that makes it possible to more easily grasp differential information between a plurality of locations.

The related information acquisition unit 52 acquires information related to the first location (the hometown) in accordance with the setting results from the setting processing unit 51.

As a result, in the timepiece wrist terminal 1, it is possible to realize a display that makes it possible to understand differential information for a desired location.

A second acquisition unit sets the current location information as the second location (the current city).

As a result, in the timepiece wrist terminal 1, it is possible to realize a display that makes it possible to understand the differential information between the current location and another location.

The output control unit 55 controls the output unit 18 so as to display the differential information as a continuous quantity in a prescribed area of the display region.

As a result, in the timepiece wrist terminal 1, it is possible for the user to more intuitively understand the differential information between a plurality of locations as a result of the differential information being displayed as a continuous quantity.

The prescribed area is disposed in a peripheral portion of the display region.

As a result, in the timepiece wrist terminal 1, it is possible to cause the user to see the differential information in a more visible location compared to other displays as a result of the prescribed area being disposed in the peripheral portion.

In addition, the time difference calculation processing unit 54 sets the location of the prescribed area in the display region based on the first location (the hometown) and the second location (the current city).

The output control unit 55 controls the output unit 18 so as to display the differential information in the prescribed area set by the time difference calculation processing unit 54.

As a result, in the timepiece wrist terminal 1, it is possible to cause the user to more intuitively understand the differential information between a plurality of locations as a result of the differential information being displayed as a continuous region.

The location information acquisition unit 53 acquires first time information as information related to the first location (the hometown).

The related information acquisition unit 52 acquires second time information as information related to the second location (the current city).

The time difference calculation processing unit 54 generates time differential information in accordance with the first time information and the second time information.

As a result, in the timepiece wrist terminal 1, it is possible to realize a display that makes it possible to more easily understand time differential information between a plurality of locations.

The differential information generated by the time difference calculation processing unit 54 includes the size of the difference between the information related to the first location (the hometown) and the information related to the second location (the current city).

The output control unit 55 controls the output unit 18 so as to perform display of a continuous quantity in which the display configuration has been modified in accordance with the size of the difference in the differential information generated by the time difference calculation processing unit 54.

As a result, it is possible to cause a user to more intuitively grasp the size of the difference in the timepiece wrist terminal 1.

The output control unit 55 controls the output unit 18 so as to perform display of a continuous quantity in which the display configuration has been modified when the size of the difference in the differential information generated by the time difference calculation processing unit 54 exceeds a prescribed reference value.

As a result, it is possible to cause the user to more intuitively grasp the size of the difference that is greater than the prescribed reference value in the timepiece wrist terminal 1.

The output control unit 55 controls the output unit 18 so as to display a map in a display region that is different from the prescribed area in accordance with the first location (the hometown) and the second location (the current city).

As a result, it is possible in the timepiece wrist terminal 1 to cause the user to more intuitively grasp absolute positional relationships by referring to the map.

The output control unit 55 controls the output unit 18 so as to display a day-night depiction on the map in accordance with information related to the first location (the hometown) and information related to the second location (the current city).

As a result, in the timepiece wrist terminal 1, it is possible to give the user a sense of the day-night state of the first location and the second location and the absolute time of the time difference.

The output control unit 55 controls the output unit 18 so as to display the differential information as a continuous quantity in a prescribed area of the display region and to display a map in accordance with the first location (the hometown) and the second location (the current city).

As a result, in the timepiece wrist terminal 1, it is possible to cause the user to more intuitively grasp the absolute positional relationship when referring to the map since the map is displayed in accordance with the first location and the second location and since the difference is displayed so as to correspond to the map.

The output control unit 55 controls the output unit 18 so as to display the map and display the differential information displayed as a continuous quantity in the prescribed area using a positional relationship based on the first location (the hometown) and the second location (the current city).

As a result, in the timepiece wrist terminal 1, it is possible to cause the user to more intuitively grasp the absolute positional relationship when referring to the map since the terminal 1 displays the map using the positional relationship corresponding to the first location (the hometown) and the second location (the current city) and displays the difference so as to correspond to the map.

The information related to the first location (the hometown) and the information related to the second location (the current city) includes information related to: time, latitude, longitude, elevation, and temperature.

As a result, it is possible in the timepiece wrist terminal 1 to show various types of differences as information.

The present invention is not limited to the embodiments described above, and includes changes, modifications, and the like made within a scope by which it is possible to achieve the aim of the present invention.

In the above-described embodiments, it is possible to configure the electronic device such that when the displayed city name is long, the name is shortened or an abbreviated name, such as a city code, is used.

In addition, in the above-described embodiments, the electronic device was configured so as to determine whether or not a time difference calculated by the time difference calculation processing unit 54 met or exceeded a threshold value. The present invention is not limited to such an embodiment however, and the device may be configured so as to display the time difference as a continuous quantity without determining whether or not the time difference exceeds a threshold value.

Also in the above-described embodiments, a time difference was used as an example for displaying a difference between cities. The present invention is not limited to such a configuration, however. Another configuration can be used as long as the configuration can display a difference between a plurality of points, such as between cities. Differences in information such as temperature, latitude, longitude, and the like may be quantitatively displayed, for example. In addition, the device is not limited to displaying a difference between two points, and may be configured so as to display differences among a plurality of points or a difference with a reference value or the like.

Also in the above-described embodiments, the shape of the output unit 18 forming the display was substantially circular; however, the output unit 18 may be configured so as to have any desired shape, such as a rectangle.

Also in the above-described embodiments, the invention was configured such that only one point (the hometown) could be set to a desired location. The device may be configured such that another point set as the current city can also be set to a desired location, however.

Also in the above-described embodiments, the invention was configured so as to process drawing contents via the timepiece wrist terminal 1. The invention may also be configured so as to externally process the drawing contents, such as via an external server, and perform only display via the timepiece wrist terminal 1. Conversely, the invention may be configured such that all processing is carried out via the timepiece wrist terminal 1.

Also in the above-described embodiments, the length of the difference was quantitatively depicted using a fixed scale; the scale for the display of continuous values may be modified in accordance with the size of the difference value, however.

Also in the above-described embodiments, the invention may be configured so as to use other points besides a desired point and the current location point, such as a point that represents the acquired location of another terminal.

Also in the above-described embodiments, an electronic device in which the present invention is applied was described as a timepiece wrist terminal 1 as an example; the electronic device is not limited to this, however.

The present invention can be generally applied to electronic devices having a time difference display processing function and a day-night display processing function, for example. The present invention can be applied to notebook personal computers, printers, television receivers, video cameras, digital cameras, portable navigation devices, mobile phones, timepiece devices, smartphones, smartwatches, portable gaming systems, and the like, for example.

The series of processes described above can be accomplished by hardware or software.

In other words, the functional configuration in FIG. 4 is merely an example, and the present invention is not limited thereto. In other words, the type of functional blocks used to achieve these functions is not limited to the example in FIG. 4 as long as a function in which the series of processes described above can be fully executed is included in the timepiece wrist terminal 1.

One functional block may be a single hardware unit or a single software unit, or a combination of these.

If the series of processes are carried out via software, the programs constituting the software are installed on a computer or the like via a network or a recording medium.

The computer may be a computer installed in specialized hardware. The computer may be a computer that can execute various functions by installing various programs, or it may be a general use personal computer, for example.

A recording medium that includes such programs is not only constituted of the removable media 31 in FIG. 1 that is provided separately from the main device body in order to provide the programs to the user, it is also constituted of a recording medium or the like provided to the user by being pre-installed in the main device body. The removable media 31 is a magnetic disk (including floppy disks), an optical disk, a magneto-optical disk, or the like, for example. An optical disk is constituted of a CD-ROM (compact disc-read only memory), a DVD (digital versatile disc), a Blu-ray (registered trademark) Disc, or the like, for example. A magneto-optical disk is an MD (MiniDisc) or the like. The recording medium provided to the user by being pre-installed in the main device body is the ROM 12 in FIG. 1 in which programs are recorded, or a hard disk or the like included in the storage unit 19 in FIG. 1, for example.

In the present specification, during the steps that mention the programs recorded in the recording medium, the processes performed chronologically in the order mentioned in the steps are not necessarily performed in a chronological order and also include processes performed individually or in parallel.

Also in the present specification, the term "system" refers to the overall device formed via a plurality of devices, a plurality of unit, and the like.

Several embodiments of the present invention were described above, but these are merely examples and do not limit the technological scope of the present invention. Various other embodiments can be made from the present invention, and it is possible to make various modifications such as omission or replacement of elements within a scope that does not depart from the gist of the present invention. These embodiments and modifications thereof are included in the scope and gist of the invention disclosed in the present specification and the like, and are included in the invention disclosed in the claims and the equivalents thereof.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic device, comprising:
   a display unit; and
   a processor connected to the display unit, the processor being configured to:
      acquire first location information of a first location located in a first time zone;
      acquire second location information of a second location located in a second time zone that differs from said first time zone;
      acquire first information related to said first location information;
      acquire second information related to said second location information;
      generate differential information representing a difference between the first information related to the first location information and the second information related to the second location information;
      specify a location on the display unit at which the second information is displayed; and
      control the display unit so as to display an object on the display unit that represents said differential information, said object having a continuous shape that is continuous from a location at which the first information is displayed on the display unit to said specified location at which the second information is displayed on the display unit, at least one of attributes of said continuous shape representing said differential information,
   wherein the processor controls said display unit so as to display said object in a peripheral portion of a display region of the display unit.

2. The electronic device according to claim 1,
   wherein the processor is further configured to set said first location information, and
   wherein the processor acquires the first information related to said first location information in accordance with a setting result obtained via said setting.

3. The electronic device according to claim 1, wherein the processor sets current location information as said second location information.

4. The electronic device according to claim 1, wherein the processor is further configured to:
   set, in accordance with the first location information and the second location information, a location of a prescribed area in which said object will be displayed; and
   control the display unit so as to display said object in said prescribed area set via said setting.

5. The electronic device according to claim 1, wherein the processor is further configured to:
   acquire first time information as the first information related to the first location information;
   acquire second time information as the second information related to the second location information; and
   generate time differential information representing a difference between said first time information and said second time information as said differential information.

6. The electronic device according to claim 1,
   wherein the processor controls the display unit so as to set a dimension of said continuous shape of said object, as said at least one of the attributes of the object, based on the differential information.

7. The electronic device according to claim 6, wherein the processor controls the display unit such that said object is displayed only when a differential amount representing the differential information is greater than a prescribed threshold.

8. The electronic device according to claim 1, wherein the processor controls the display unit so as to display a map in a display area in the display region that is different from the peripheral portion in which said object is displayed.

9. The electronic device according to claim 8, wherein the processor controls the display unit so as to display a day-night depiction on said map in accordance with the first information related to said first location information and the second information related to said second location information.

10. The electronic device according to claim 8, wherein the processor controls the display unit so as to display said map in accordance with said first location information and said second location information.

11. The electronic device according to claim 10, wherein the processor controls the display unit so as to display said map and said object in accordance with a positional relationship obtained from said first location information and said second location information.

12. The electronic device according to claim 8, wherein the processor controls the display unit so as to display a first fan shaped region that is centered at a center of said map and that indicates a daytime region and a second shaped region that is centered at the center of said map and that indicates a nighttime region in accordance with the first information related to said first location information and the second information related to said second location information.

13. The electronic device according to claim 1, wherein the first information related to the first location information and the second information related to the second location information includes information related to time, latitude, longitude, elevation, or temperature.

14. The electronic device according to claim 1, wherein the location at which the first information is displayed is fixed on the display unit, and the location at which the second information is displayed on the display unit is set in accordance with the second information.

15. The electronic device according to claim 1, wherein the location at which the first information is displayed on the display unit is predetermined.

16. A display method to be performed by an electronic device having a processor, comprising:
    causing the processor to:
       acquire first location information of a first location located in a first time zone;

acquire second location information of a second location located in a second time zone that is different from said first time zone;
acquire first information related to said first location information;
acquire second information related to said second location information;
generate differential information representing a difference between the first information related to the first location information and the second information related to the second location information;
specify a location on a display unit at which the second information is displayed; and
control the display unit so as to display an object on the display unit that represents said differential information, said object having a continuous shape that is continuous from a location at which the first information is displayed on the display unit to said specified location at which the second information is displayed on the display unit, at least one of attributes of said continuous shape representing said differential information,
wherein the method causes the processor to control said display unit so as to display said object in a peripheral portion of a display region of the display unit.

17. A non-transitory computer-readable storage medium having stored therein a program executable by an electronic device having a processor, the program stored in the storage medium causing the processor to perform the following:

acquire first location information of a first location located in a first time zone;
acquire second location information of a second location located in a second time zone that is different from said first time zone;
acquire first information related to said first location information;
acquire second information related to said second location information;
generate differential information representing a difference between the first information related to the first location information and the second information related to the second location information;
specify a location on a display unit at which the second information is displayed; and
control the display unit so as to display an object on the display unit that represents said differential information, said object having a continuous shape that is continuous from a location at which the first information is displayed on the display unit to said specified location at which the second information is displayed on the display unit, at least one of attributes of said continuous shape representing said differential information,
wherein the program causes the processor to control said display unit so as to display said object in a peripheral portion of a display region of the display unit.

* * * * *